United States Patent
Iammarino et al.

(10) Patent No.: US 8,348,333 B2
(45) Date of Patent: Jan. 8, 2013

(54) MOTOR-VEHICLE STRUCTURE HAVING A FRONT MODULE CONSTITUTED BY ELEMENTS MADE OF PLASTIC AND/OR COMPOSITE MATERIAL

(75) Inventors: Michele Iammarino, Orbassano (IT); Augusto Masia, Orbassano (IT); Michele Castaldi, Orbassano (IT)

(73) Assignee: C.R.F. Societá Consortile per Azioni, Orbassano (Torino) (IT)

( * ) Notice: Subject to any disclaimer, the term of this patent is extended or adjusted under 35 U.S.C. 154(b) by 189 days.

(21) Appl. No.: 12/797,926

(22) Filed: Jun. 10, 2010

(65) Prior Publication Data
US 2011/0304174 A1    Dec. 15, 2011

(51) Int. Cl.
B62D 21/15    (2006.01)
(52) U.S. Cl. .................................. 296/187.09
(58) Field of Classification Search ........... 296/187.09, 296/187.1, 187.08, 193.07, 193.09, 203.01, 296/204, 203.02
See application file for complete search history.

(56) References Cited

U.S. PATENT DOCUMENTS

| | | | |
|---|---|---|---|
| 6,155,633 A * | 12/2000 | Minami et al. | 296/193.09 |
| 6,237,990 B1 * | 5/2001 | Barbier et al. | 296/187.09 |
| 6,736,449 B2 * | 5/2004 | Takahashi et al. | 296/203.02 |
| 7,374,233 B2 * | 5/2008 | Li et al. | 296/203.02 |
| 8,118,351 B2 * | 2/2012 | Gonin et al. | 296/193.09 |
| 2003/0025359 A1 * | 2/2003 | Takahashi et al. | 296/203.02 |
| 2004/0104599 A1 * | 6/2004 | Svendsen et al. | 296/187.09 |
| 2005/0062316 A1 * | 3/2005 | Kim | 296/204 |
| 2005/0212334 A1 * | 9/2005 | Murata et al. | 296/204 |
| 2005/0218645 A1 | 10/2005 | Shinta et al. | |
| 2006/0113784 A1 * | 6/2006 | Kishima | 280/784 |
| 2006/0255625 A1 * | 11/2006 | Kitoh et al. | 296/204 |
| 2011/0115241 A1 * | 5/2011 | Gonin | 293/120 |

FOREIGN PATENT DOCUMENTS

| | | |
|---|---|---|
| EP | 0 919 452 | 6/1999 |
| EP | 1 281 603 | 2/2003 |
| JP | 2008-230724 | 10/2008 |

OTHER PUBLICATIONS

European Search Report EP 08425793.0 dated Apr. 27, 2009.

* cited by examiner

Primary Examiner — H Gutman
(74) Attorney, Agent, or Firm — Nixon & Vanderhye P.C.

(57) ABSTRACT

A motor-vehicle structure, in particular for a commercial vehicle, van, or the like, comprises a metal frame including a pair of longitudinal members connected by cross members, and a metal cab body mounted on the frame, including a pair of longitudinal sub-cab members supported on the longitudinal members of the frame by means of elastic supports that enable relative movements in a vertical direction of the body with respect to the frame. A front cross member for absorption of impact is fixed to the front end of the two longitudinal frame members. A main front plate is connected to the front end of each longitudinal frame member and faces a respective auxiliary front plate connected to the front end of the respective longitudinal sub-cab member to enable distribution of the applied forces of the aforesaid front cross member between the longitudinal members of the frame and the longitudinal sub-cab members. The structure comprises a front subassembly or module, made up of elements made of plastic and/or composite material, fixed to the cab body and defining the front part of the bodywork of the motor vehicle.

11 Claims, 13 Drawing Sheets

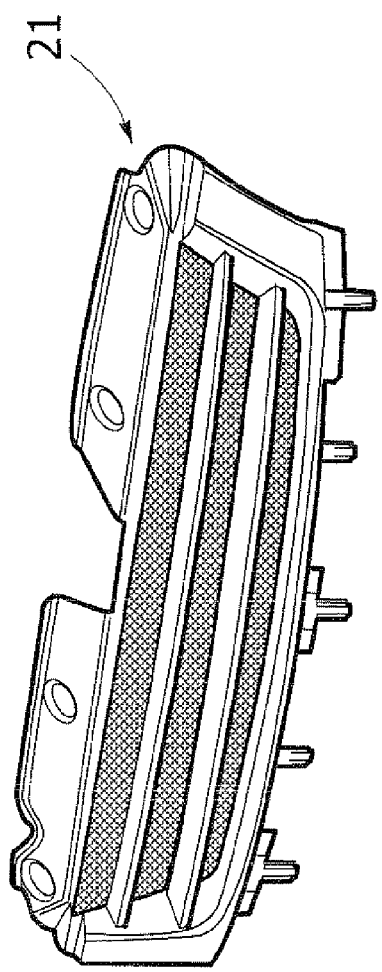
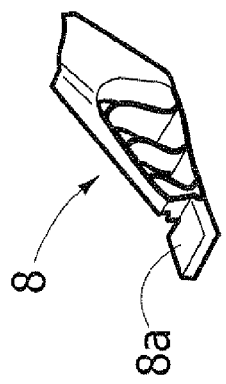
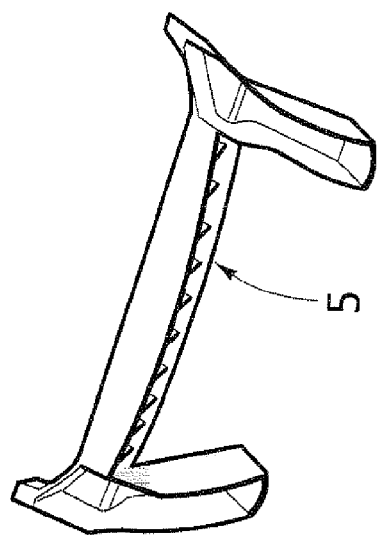
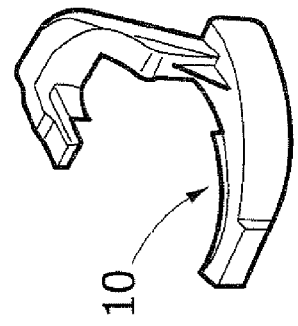
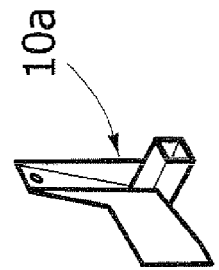

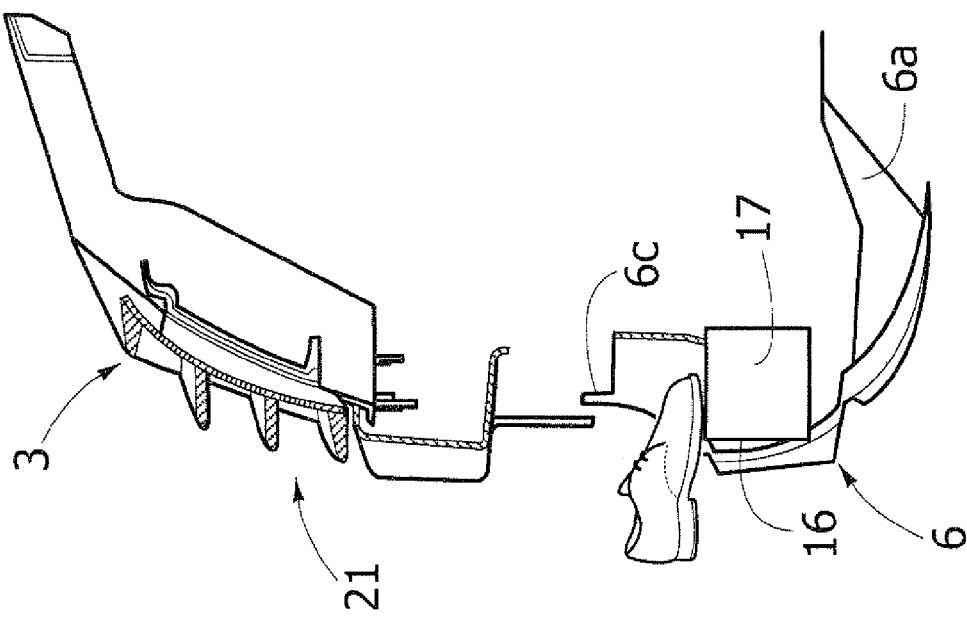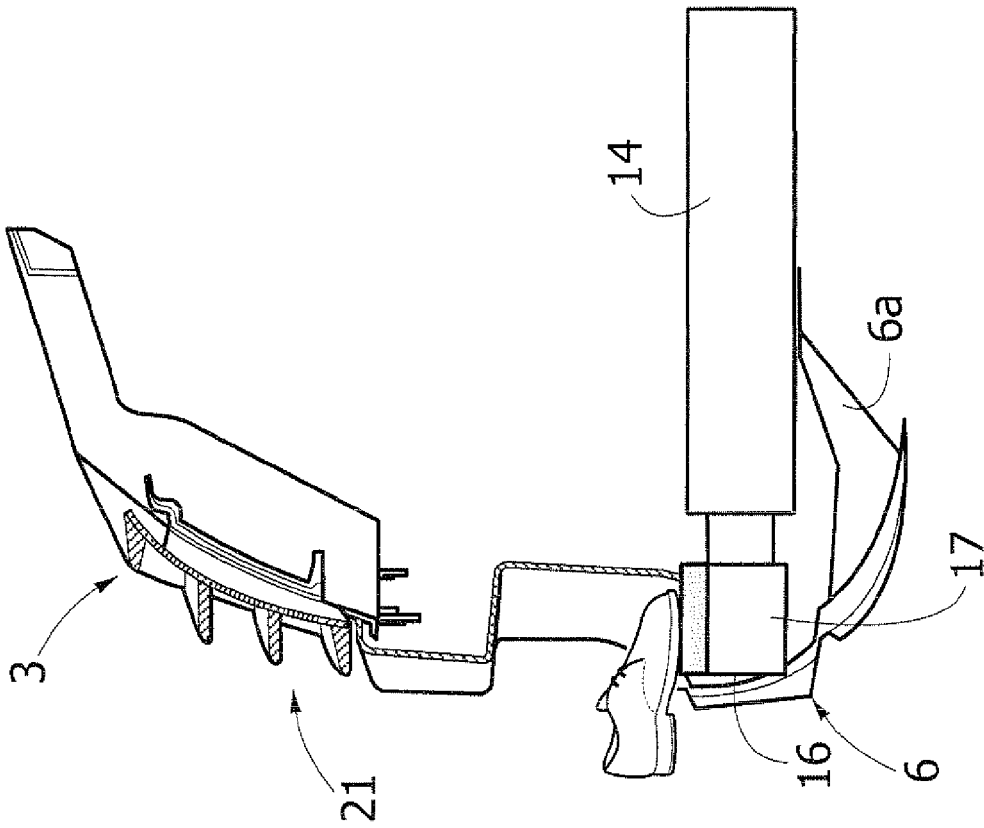

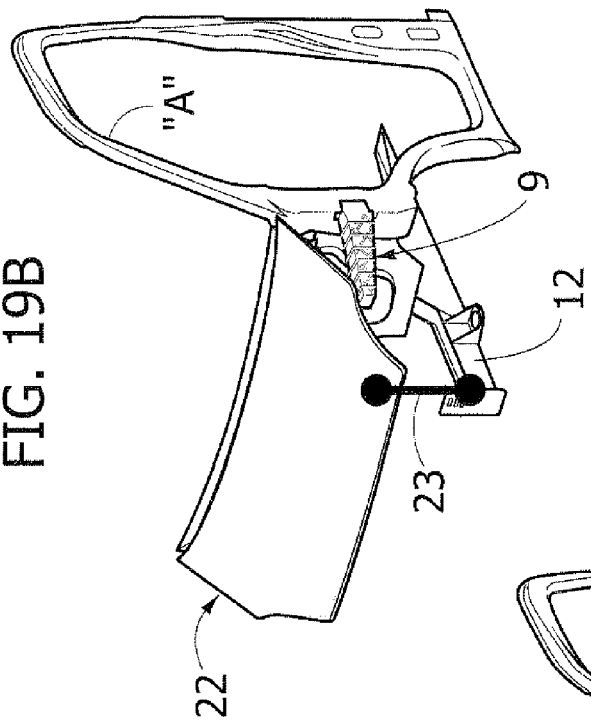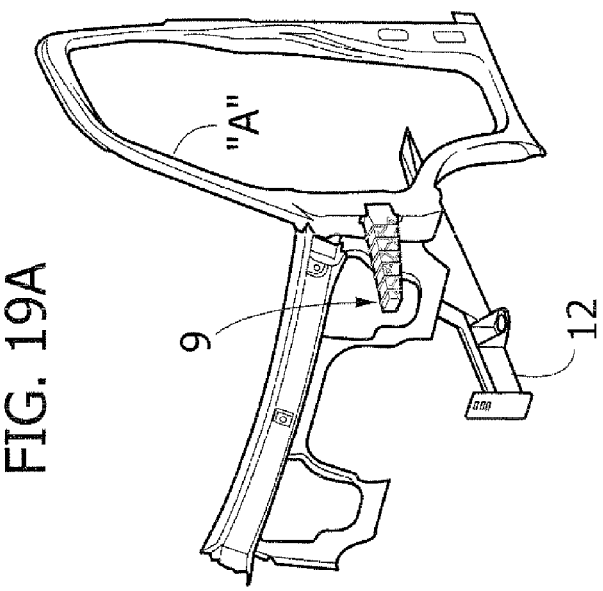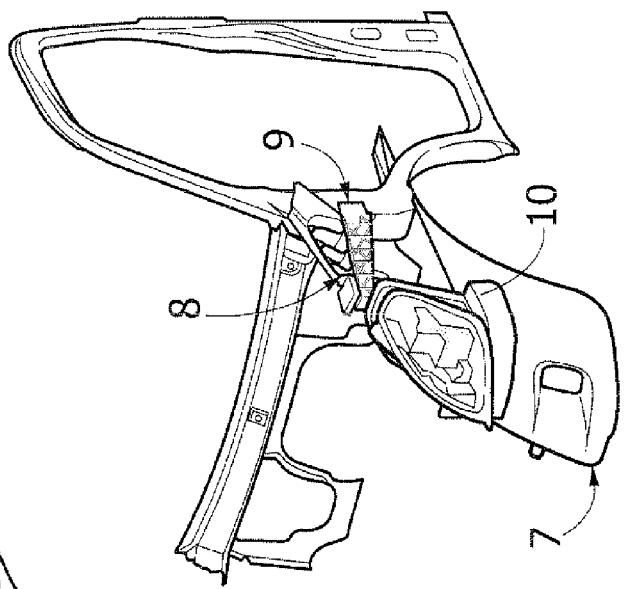

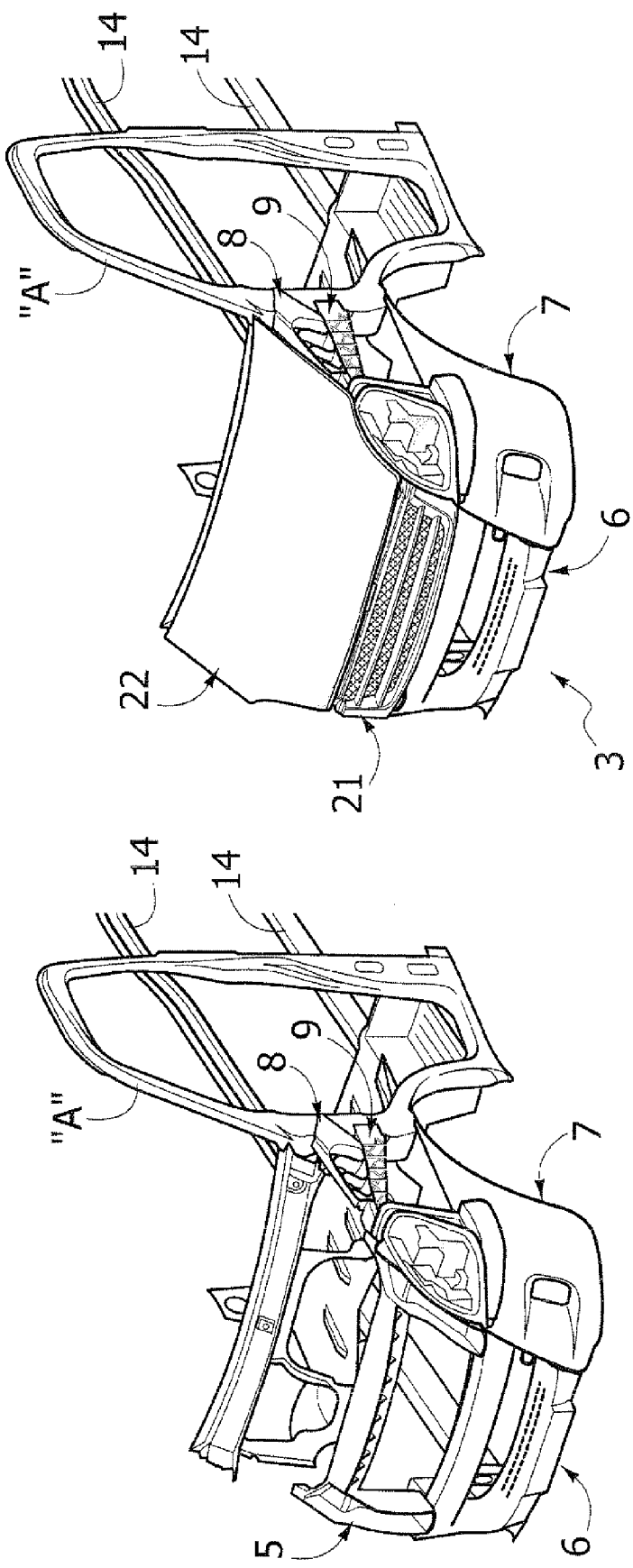

MOTOR-VEHICLE STRUCTURE HAVING A FRONT MODULE CONSTITUTED BY ELEMENTS MADE OF PLASTIC AND/OR COMPOSITE MATERIAL

BACKGROUND OF THE INVENTION

The present invention relates to motor-vehicle structures, for example for commercial vehicles, vans, buses or the like, of the type comprising a metal frame including a pair of longitudinal members connected by cross members and a metal cab body mounted on the frame and including a pair of longitudinal sub-cab members supported on the longitudinal members of the frame by means of elastic supports that enable relative movements in a vertical direction of the body with respect to the frame.

The object of the present invention is to provide a motor-vehicle structure of the type referred to above provided with a front module constituted by elements made of plastic and/or composite material, which will have a reduced number of components, will be particularly light, and will guarantee good characteristics both from the standpoint of resistance to impact and from the standpoint of ease and rapidity of assembly.

With a view to achieving the above purpose, the subject of the invention is a motor-vehicle structure having the characteristics described below, including a motor-vehicle structure comprising:

- a metal frame, including a pair of longitudinal members connected by cross members;
- a metal cab body mounted on the frame, including a pair of longitudinal sub-cab members supported on the longitudinal members of the frame by means of elastic supports that enable relative movements in a vertical direction of the body with respect to the frame;
- a front metal cross member for absorption of impact, fixed to the front ends of the two longitudinal members of the frame;
- a main front metal plate connected to the front end of each longitudinal frame member, facing a respective auxiliary front metal plate connected to the front end of a respective longitudinal sub-cab member, to distribute the forces applied by the front cross member between the longitudinal members of the frame and the longitudinal sub-cab members; and
- a front subassembly or module made up of elements made of plastic, composite material, or both plastic and composite material, fixed to the cab body and defining the front part of a bodywork of the motor vehicle.

The subject of the invention is also a method for assembly of a motor-vehicle structure of the type specified above and described below, including a method for assembly of a motor-vehicle structure as mentioned directly above, wherein the cab body is subjected to painting, after which the front subassembly or module is assembled thereon by means of successive assembly of the components made of plastic and/or composite material that constitute it, the cab body being coupled to the frame of the motor vehicle in an intermediate step of the operations of assembly of the various components constituting the front subassembly or module.

BRIEF DESCRIPTION OF THE DRAWINGS

The invention will now be described with reference to the annexed drawings, which are provided purely by way of non-limiting example and in which:

FIGS. 8-16 illustrate the component parts the front module;

FIG. 17 is a schematic lateral cross-sectional view of the front module according to the invention;

FIG. 18 illustrates a variant of FIG. 17; and

DETAILED DESCRIPTION OF THE INVENTION

Figure 1:
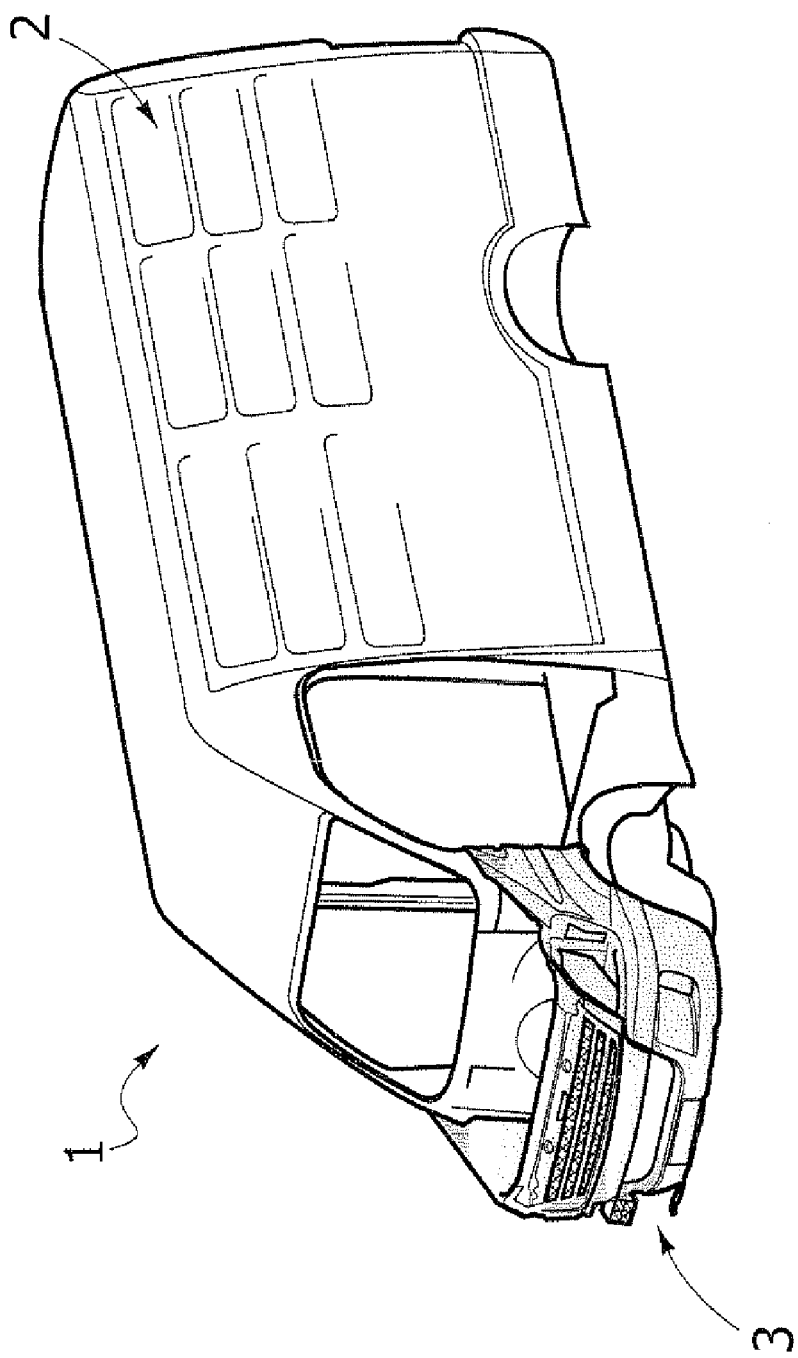
FIG. 1 is a schematic perspective view of an example of motor-vehicle structure according to the invention.

In FIG. 1, the reference number 1 designates as a whole a structure of a motor vehicle, in the specific case a van, comprising a cab body 2 consisting of elements made of sheet metal welded together, and a front module 3 constituted by elements made of plastic and/or composite material.

Figure 2:
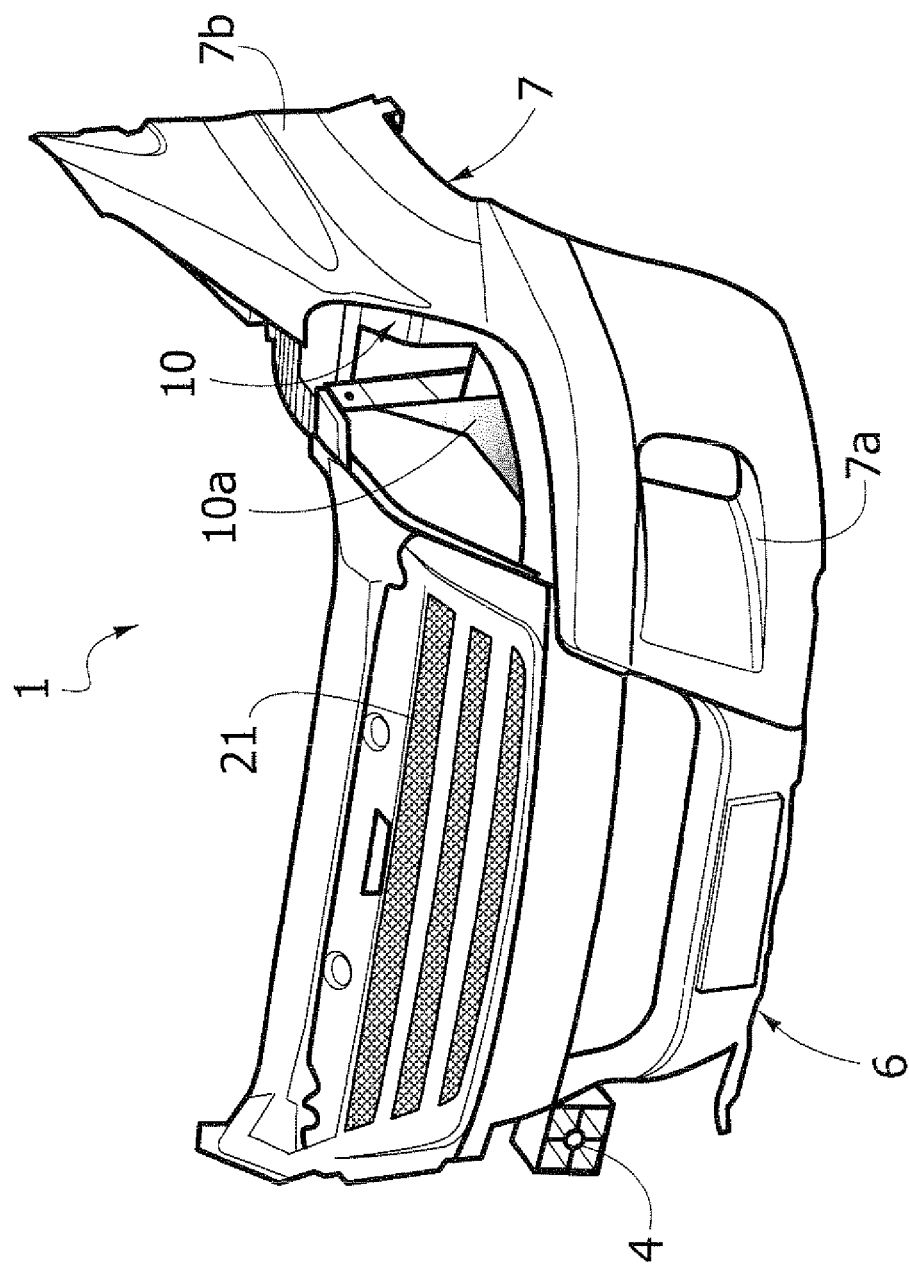
FIG. 2 is a partial perspective view of the front module forming part of the motor-vehicle structure of FIG. 1.
Figure 3:
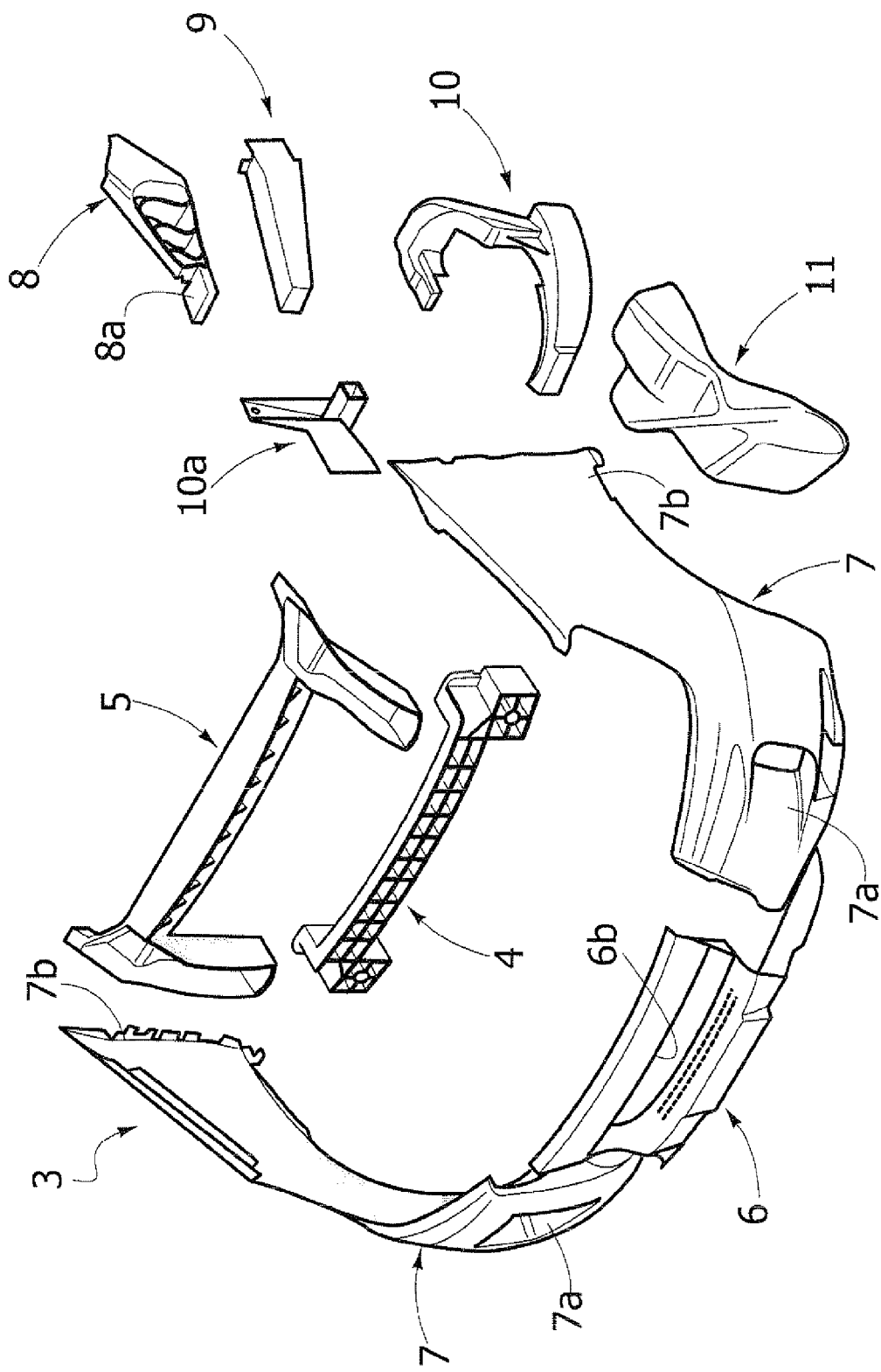
FIG. 3 is an exploded perspective view of the front module of FIG. 2.

FIG. 2 is a partial perspective view of the front module 3. The parts that make up the module 3 may be clearly seen in FIG. 3 in an exploded condition. They include a bottom front cross-member element 4, a top front cross-member element 5, a central bumper portion 6, two side portions 7, incorporating end portions 7a of the bumper, and front portions 7b of the sides of the bodywork, three pairs of side supports 8, 9, 10a (FIG. 3 illustrates only the set of three left-hand supports 8, 9, 10a), two frames 10 for the front sets of lights of the motor-vehicle (FIG. 3 shows only the left-hand frame 10) and two wheelhouse elements 11 (FIG. 3 illustrates only the left-hand element 11). As has been mentioned, all the elements 4-11 constituting the front module 3 are made of plastic and/or composite material. Their function and the way in which they are connected together and to the remaining part of the structure of the motor-vehicle will be illustrated in detail in what follows.

Figure 4:
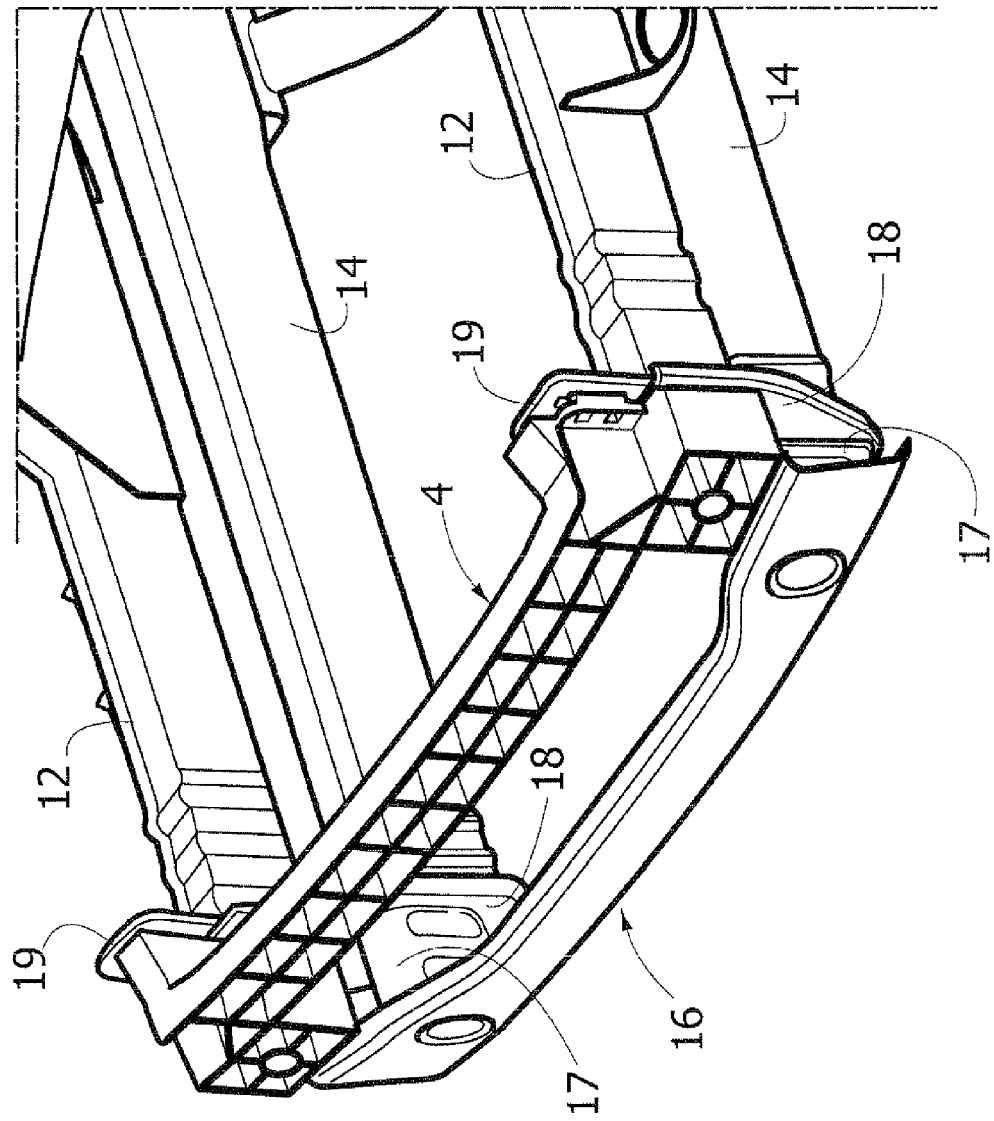
FIG. 4 is a perspective view of the longitudinal members forming part of the frame of the motor vehicle, of the longitudinal sub-cab members forming part of the body mounted on the frame and of a component of the front module constituting a bottom front cross-member element.
Figure 5:
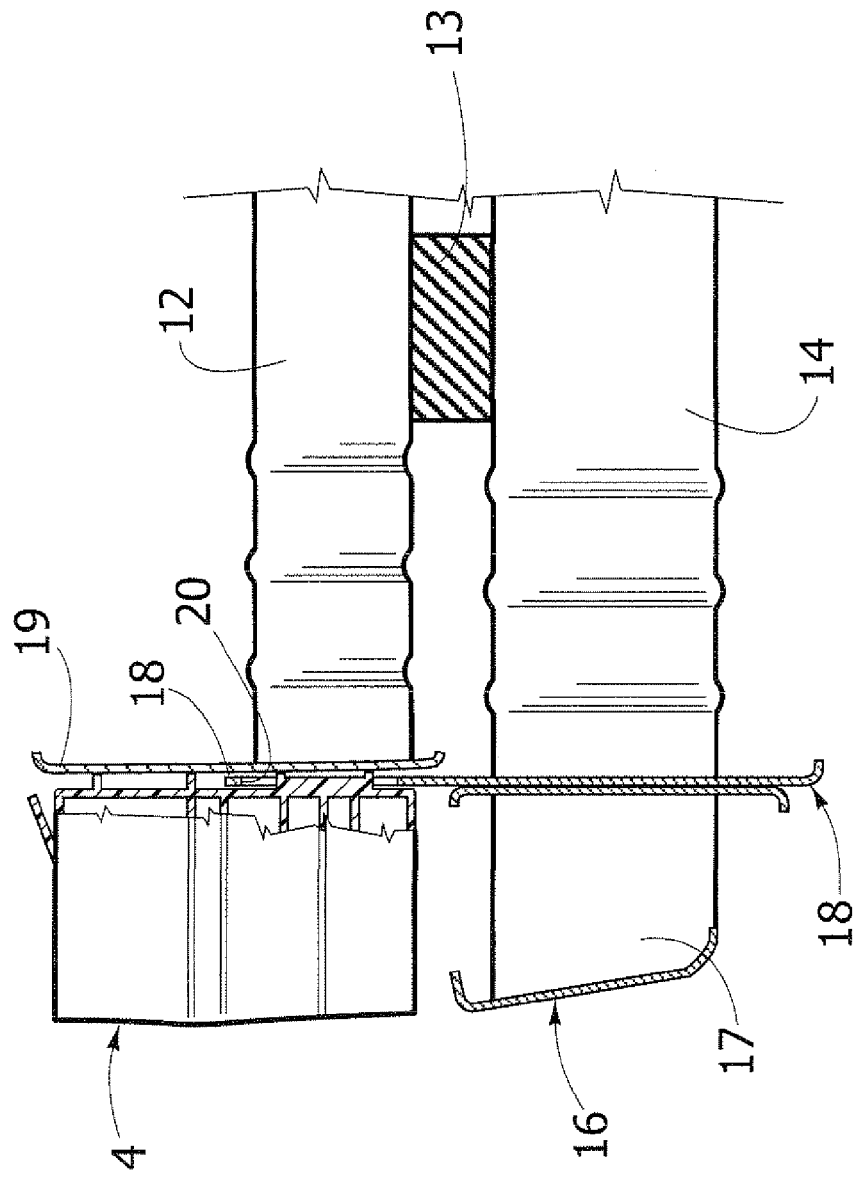
FIG. 5 is a schematic lateral cross-sectional view of the assembly of FIG. 4.
Figure 6:
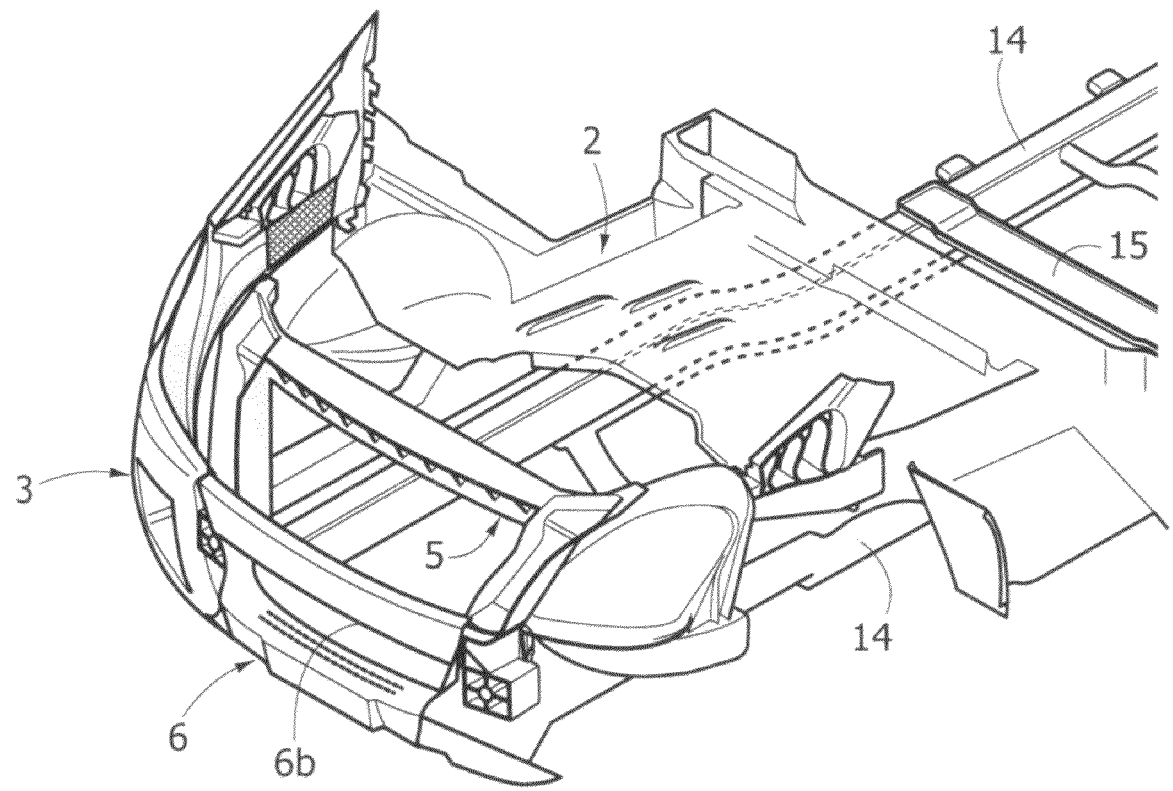
FIG. 6 is a further partially sectioned perspective view of part of the frame of the motor vehicle, of part of the body of the cab, and of part of the front module.
Figure 7:
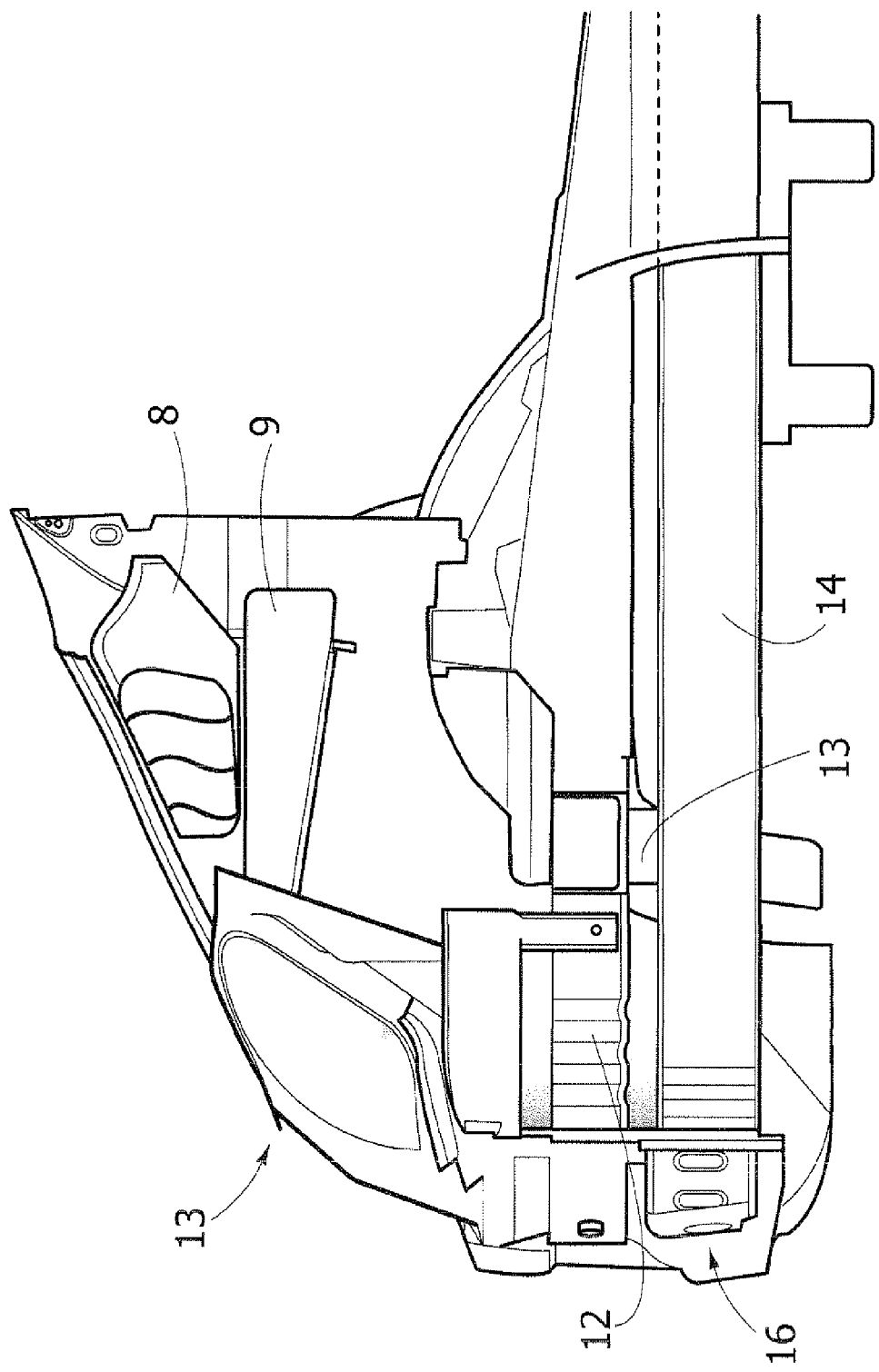
FIG. 7 is a side view of the assembly of FIG. 6.
Figure 13:
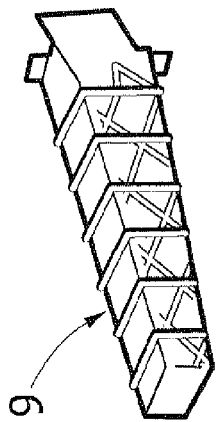
Figure 15:
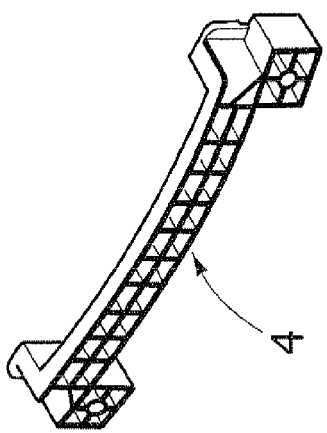
Figure 14:
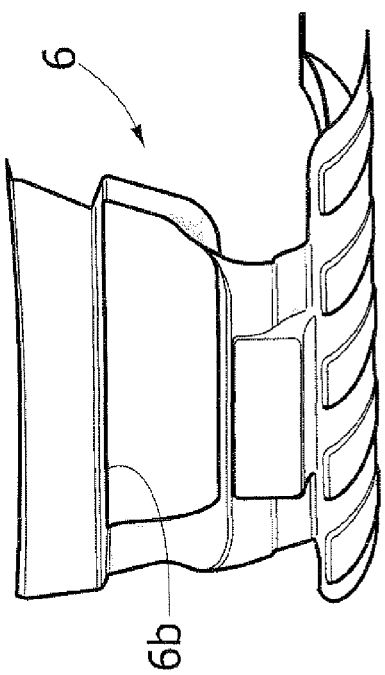
Figure 16:
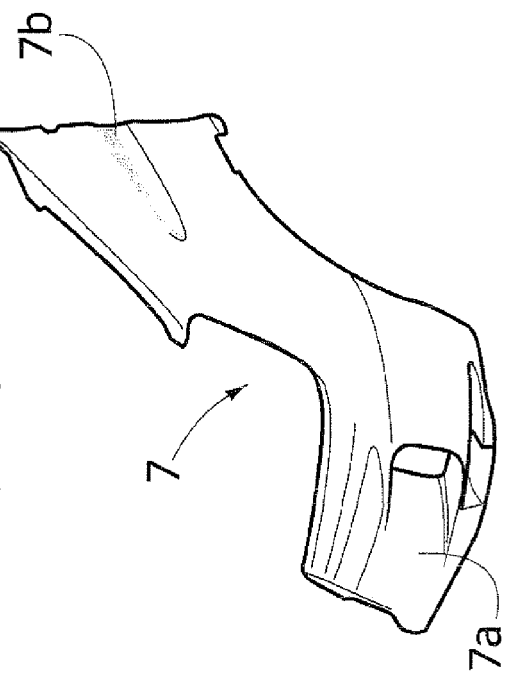

With reference to FIGS. 4 and 5, the body of the cab of the motor-vehicle, made of sheet metal, includes two longitudinal sub-cab members 12, which rest, with the interposition of elastic supports 13 (FIG. 5), on the traditional longitudinal members 14 forming part of the metal frame of the motor vehicle. According to the traditional technique, the two longitudinal members 14 are joined together by a plurality of cross members (see, for example, the cross member 15 in FIG. 6).

With reference once again to FIGS. 4 and 5, fixed to the front ends of the two longitudinal members 14 of the frame of the motor vehicle is a front metal cross member 16, for absorption of any front impact. The cross member 16 is connected to the front ends of the longitudinal members 14 by means of box structures 17. Moreover fixed in a position corresponding to the front end of the longitudinal members 14 are two main front plates 18. The plates 18 extend upwards above the longitudinal members 14 and are set facing two respective auxiliary plates 19, which are in turn fixed to the front ends of the two longitudinal sub-cab members 12 (see also FIG. 5).

With reference also to FIG. 3, the front module includes a bottom cross-member element 4 having a ribbed structure made of a single piece of plastic and/or composite material, the ends of which are slotted at the front into the parts projecting at the top of the aforesaid auxiliary plates 19 and are moreover bolted to the longitudinal sub-cab member 12. The slotted coupling enables limitation of the moment transmitted to the cross-member element 4 due to the loads acting on the longitudinal member following upon impact. The main plates 18, where these face the auxiliary plates 19, have through openings 20 sufficiently wide as to prevent interference with parts fixed with respect to the cross-member element 4 or to the longitudinal members 12 during any relative movements in a vertical direction between the longitudinal members 12 and the longitudinal members 14.

The function of the main plates 18 and of the auxiliary plates 19 is to distribute the forces applied by the front cross member 16 following upon front impact between the longitudinal members 14 of the frame and the longitudinal sub-cab members 12 of the body.

With reference also to FIGS. 6-16, the front module 3 is assembled by providing initially the two side supports 9 on the body of the motor vehicle. In particular, one end of each support 9 is fixed to the upright "A" of the respective side of the body, as illustrated in FIG. 19A so as to extend in cantilever fashion forwards starting from said upright. FIG. 19A at seq. Show, for reasons of clarity, only part of the body of the motor vehicle. As may be seen in FIG. 19B, provisionally mounted on the structure thus prearranged is the bonnet 22 with the aid of a positioning tool 23 (illustrated schematically in FIG. 19B). In said condition, the entire body is subjected to a painting bath, after which further components of the front module are mounted. In particular, as may be seen in FIG. 19B, mounted on each side support 9 is the respective side support 8. With reference to FIG. 3, each side support 8 has a front end with a resting surface 8*a* mounted on which is the respective frame 10 of the set of lights. The bottom part of said frame is left free to bend in order to prevent it from possibly constituting an obstacle to absorption of the energy of impact by means of collapse of the longitudinal member. Next, a respective side support 10*a* is mounted on the support 8 and on the frame 10 and is then used in turn as rest for the respective side portion 7, which also rests on the respective longitudinal sub-cab member 12.

In the present description and in the annexed drawings the means for mutual connection of the parts made of plastic and/or composite material that constitute the front module of the invention are not illustrated. It is evident that said means can be of any known type and can be constituted, for example, by gluing means, or else bolts, or else both.

Figure 19D:
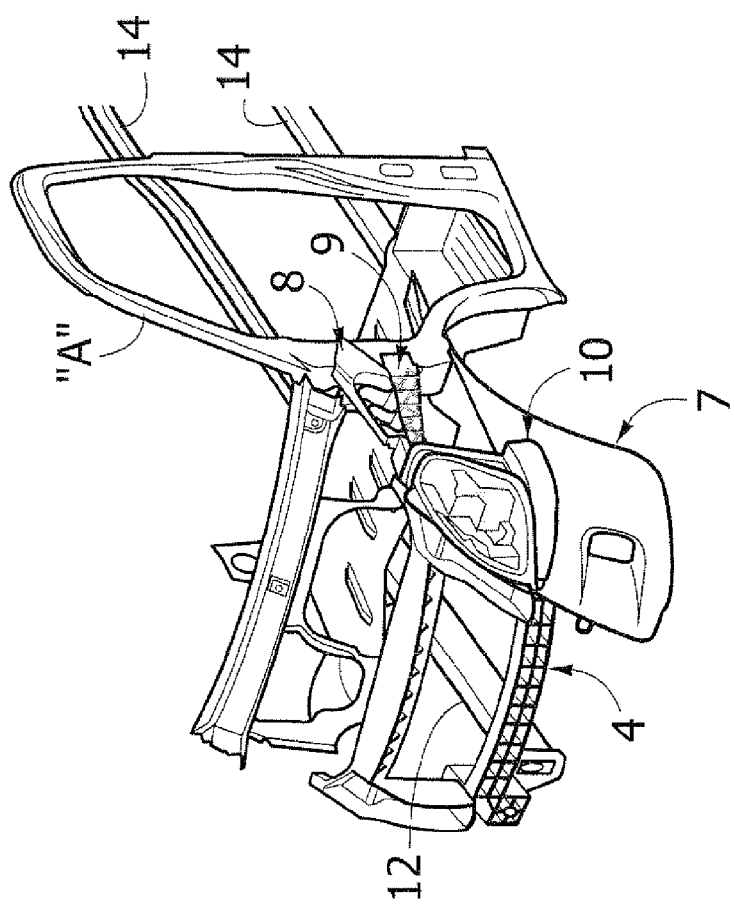
FIG. 19 illustrates the various steps of the composition of the front module forming part of the motor-vehicle structure according to the invention.
Figure 19E:
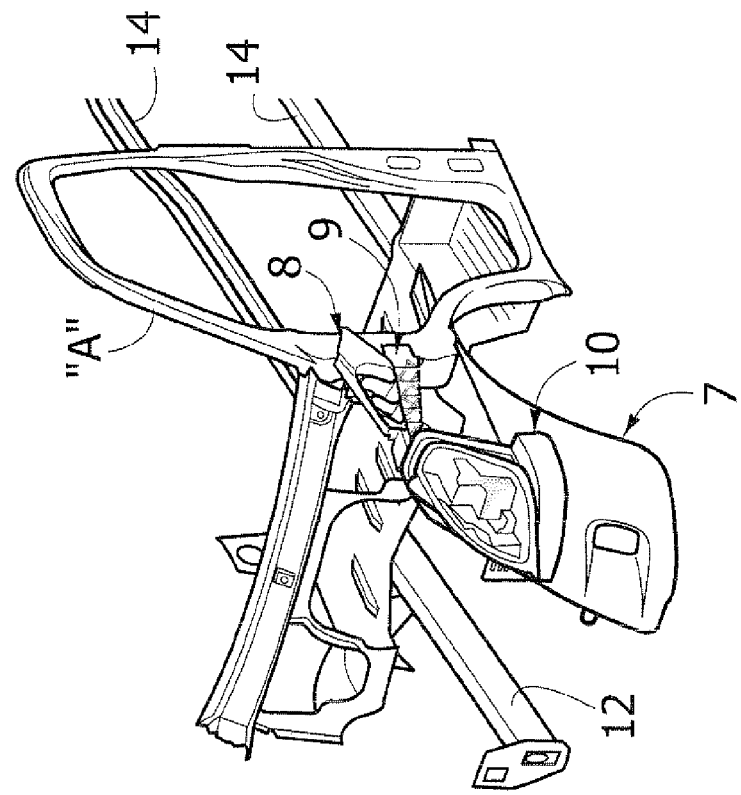

Once the elements 8, 9, 10, 10*a*, 7 have been installed, the painted body and thus completed is mounted on the metal frame, which includes the two longitudinal members 14 (FIG. 19D). Once said coupling or marriage has been made, the front module is completed with the bottom front cross-member element 4, which is fixed in the way that has been described with reference to FIGS. 4 and 5 and, on top of it, with the top front cross-member element 5 (FIG. 19E). Once said operation has been performed, the central portion of the bumpers 6 is then mounted by being fixed underneath the bottom cross-member element 4. As may be seen in FIG. 17, said element has at its bottom end a flexible tab 6*a*, which is joined to the longitudinal members 14 and is deformed in the course of the relative movements between the body, to which it is fixed with respect to the central bumper element 6, and the frame including the longitudinal members 14. As may be clearly seen in FIG. 16, the central bumper portion 6 has a front window 6*b*, which enables access to the front cross member 16 (FIG. 4), which has been described above. As illustrated schematically in FIG. 17, said arrangement enables an operator to rest his feet on the cross member 16 when he has to climb up to gain conveniently access to the top front part of the motor-vehicle in order to carry out maintenance operations. In the final step of assembly (FIG. 19G) there is finally mounted the front grill, which is not visible in FIG. 3, but is illustrated in itself in FIG. 8, and which is here designated by the reference number 21.

FIG. 18 illustrates a variant in which the central bumper portion 6 is mounted on the front cross member 16, in which case the front grill 21 has a bottom edge 21*a* that sets itself at the front and at a distance with respect to the top edge 6*c* of the central bumper portion 6, to enable relative displacements of said elements during the vertical movements of the body with respect to the frame.

Thanks to the characteristics described above, the front module 3, constituted only by elements made of plastic and/or composite material, is characterized by a very small number of components (fifteen in the example illustrated), for a considerable reduction of weight with respect to the solutions with front part made of sheet metal, and also enables a greater reliability of the structure as regards the relative movements between the body and the frame. As has been seen, the front module is devised also for facilitating the operations of assembly, with particular reference to the possibility of gaining access easily to the top front part of the motor vehicle. The parts made of plastic with hollow section can also advantageously be used for integrating therein pipes and service cables associated to the engine of the motor vehicle. The operations of assembly of the motor-vehicle are thus rationalized and simplified.

Of course, without prejudice to the principle of the invention, the details of construction and the embodiments may vary widely with respect to what is described and illustrated purely by way of example, without this implying any departure from the scope of the present invention.

What is claimed is:

1. A motor-vehicle structure comprising:
    a metal frame including a pair of longitudinal members connected by cross members;
    a metal cab body mounted on the frame, including a pair of longitudinal sub-cab members supported on the longitudinal members of the frame by means of elastic supports that enable relative movements in a vertical direction of the body with respect to the frame;
    a front metal cross member for absorption of impact, fixed to the front ends of the two longitudinal members of the frame;
    a main front metal plate connected to the front end of each longitudinal frame member, facing a respective auxiliary front metal plate connected to the front end of a respective longitudinal sub-cab member, to distribute the forces applied by the aforesaid front cross member between the longitudinal members of the frame and the longitudinal sub-cab members; and
    a front subassembly or module made up of elements made of plastic, composite material, or both plastic and composite material, fixed to the cab body and defining the front part of a bodywork of the motor vehicle, wherein said front subassembly or module includes a bottom front cross-member element constituted by a single piece made of plastic, composite material, or both plastic and composite material, wherein the cross-member element has ends and the ends are fixed at the front to the aforesaid auxiliary front plates, and wherein the aforesaid main front plates have openings, through which the ends of the aforesaid bottom cross-member element are fixed to the aforesaid auxiliary plates, said openings having a sufficient width to prevent any interference from the relative vertical movements between the cab body and the longitudinal frame members.

2. The motor-vehicle structure according to claim 1, wherein said front subassembly or module moreover comprises a top front cross-member element, mounted on said bottom front cross-member element.

3. The motor-vehicle structure according to claim 1, wherein said front subassembly or module comprises a central bumper portion made of plastic, composite material, or both plastic and composite material, and fixed under the bottom cross-member element.

4. The motor-vehicle structure according to claim 1, wherein said front subassembly or module includes two side portions, each of which defines a front bumper end portion and a front side portion of a bodywork of the motor-vehicle.

5. The motor-vehicle structure according to claim 4, wherein each of said side portions is supported at the rear via one or more supports by A-style uprights of the cab body of the motor vehicle.

6. The motor-vehicle structure according to claim 5, wherein said supports include a bottom support, fixed in cantilever fashion to the A-style upright of the cab body, and a top support, mounted on the bottom support.

7. The motor-vehicle structure according to claim 6, wherein said top support has a front end for resting of a peripheral frame made of plastic for a respective front set of lights of the motor vehicle.

8. The motor-vehicle structure according to claim 7, wherein the structure comprises two auxiliary supports each of which is carried by a respective top support and by a respective frame for a set of lights and in turn supports the respective side portion of the front module.

9. The motor-vehicle structure according to claim 8, wherein said front subassembly or module moreover comprises two wheelhouse elements.

10. A method for assembly of a motor-vehicle structure according to claim 1, wherein the cab body is subjected to painting, after which the aforesaid front subassembly or module is assembled thereon by means of successive assembly of the components made of plastic and/or composite material that constitute it, said cab body being coupled to the frame of the motor vehicle in an intermediate step of the operations of assembly of the various components constituting the front subassembly or module.

11. The method according to claim 10, wherein coupling of the cab body to the frame of the motor-vehicle is performed after the aforesaid side portions have been mounted with the corresponding supporting elements and prior to mounting of the aforesaid bottom and top front cross-member elements, of the aforesaid central bumper portion and of the aforesaid front grill.

* * * * *